(12) United States Patent
Morris

(10) Patent No.: US 8,453,826 B2
(45) Date of Patent: Jun. 4, 2013

(54) CONVEYOR CHAIN

(75) Inventor: Randall Lee Morris, Cincinnati, OH (US)

(73) Assignee: The Cincinnati Mine Machinery Company, Cincinnati, OH (US)

( * ) Notice: Subject to any disclaimer, the term of this patent is extended or adjusted under 35 U.S.C. 154(b) by 251 days.

(21) Appl. No.: 12/559,799

(22) Filed: Sep. 15, 2009

(65) Prior Publication Data
US 2010/0072030 A1 Mar. 25, 2010

Related U.S. Application Data

(60) Provisional application No. 61/098,870, filed on Sep. 22, 2008, provisional application No. 61/234,398, filed on Aug. 17, 2009.

(51) Int. Cl.
*B65G 19/08* (2006.01)
*B65G 19/24* (2006.01)

(52) U.S. Cl.
USPC ............ 198/731; 198/730; 198/733; 198/734

(58) Field of Classification Search
None
See application file for complete search history.

(56) References Cited

U.S. PATENT DOCUMENTS

| 1,028,893 A | 6/1912 | Luther |
| 1,694,275 A | 12/1928 | Clifford |
| 1,790,297 A | 1/1931 | Alger |
| 1,920,500 A | 8/1933 | Garcia |
| 2,068,666 A | 1/1937 | Dunlop |
| 2,091,836 A | 8/1937 | Haaff et al. |
| 2,297,813 A | 10/1942 | Stork |
| 2,391,485 A | 12/1945 | Simmons |
| 2,398,107 A | 4/1946 | Morrow |
| 2,569,584 A | 10/1951 | Shepherd |
| 2,600,174 A | 6/1952 | William |
| 2,613,546 A | 10/1952 | Erland |

(Continued)

FOREIGN PATENT DOCUMENTS

| DE | 1166720 | 4/1964 |
| EP | 0618381 | 10/1994 |

(Continued)

OTHER PUBLICATIONS

Two-page International Search Report for PCT/US2009/057635 mailed Feb. 12, 2010.

(Continued)

*Primary Examiner* — Kavel Singh
(74) *Attorney, Agent, or Firm* — Wood, Herron & Evans, LLP

(57) ABSTRACT

A conveyor chain and system includes a conveyor chain having of side link assemblies and flight arm assemblies to form an elongated chain. The flight arm assemblies include an opposing flight arm that has an elongated body and an integral base formed with the body. A vertical sprocket opening is formed in the integral base and extends vertically through the integral base to engage a tooth of a drive sprocket to drive the flight arm. The side link assemblies include opposing side straps that include a base and a pair of side strap bosses extending outwardly from the base. The side strap bosses engage a tooth of a drive sprocket to drive the side strap. A driving member includes a pair of sprockets to engage the link and flight arm assemblies from both sides of the chain. An alternative embodiment incorporates a third sprocket located between the other sprockets.

21 Claims, 8 Drawing Sheets

U.S. PATENT DOCUMENTS

| | | | |
|---|---|---|---|
| 2,672,971 A | 3/1954 | Joy | |
| 2,674,365 A | 4/1954 | Russell | |
| 2,756,867 A | 7/1956 | Russell et al. | |
| 2,756,868 A | 7/1956 | Russell | |
| 2,756,869 A | 7/1956 | John | |
| 2,781,187 A * | 2/1957 | Russell | 299/67 |
| 2,922,511 A | 1/1960 | Ruppe | |
| 2,994,422 A | 8/1961 | Dalrymple | |
| 3,026,737 A | 3/1962 | Berg | |
| 3,086,404 A | 4/1963 | Krekeler | |
| 3,093,235 A | 6/1963 | Imse | |
| 3,103,275 A | 9/1963 | Rollins | |
| 3,155,225 A | 11/1964 | Krekeler | |
| 3,324,990 A | 6/1967 | Karlovsky, Jr. | |
| 3,463,026 A | 8/1969 | MacPherson | |
| 3,584,734 A | 6/1971 | Bennett | |
| 3,641,831 A | 2/1972 | Palmaer | |
| 3,646,752 A | 3/1972 | Kampfer | |
| 3,653,491 A * | 4/1972 | Safko et al. | 198/733 |
| 3,679,265 A | 7/1972 | Krekeler | |
| 3,748,917 A | 7/1973 | Berg | |
| 3,762,535 A | 10/1973 | Mc Mullen, Jr. et al. | |
| 3,841,707 A | 10/1974 | Kniff | |
| 3,888,133 A | 6/1975 | Krekeler et al. | |
| 3,952,860 A | 4/1976 | Specht | |
| 3,957,153 A | 5/1976 | Krekeler | |
| 3,961,702 A | 6/1976 | Blok | |
| 4,238,028 A | 12/1980 | Lake | |
| 4,265,084 A | 5/1981 | Livesay | |
| 4,339,031 A | 7/1982 | Densmore | |
| 4,441,605 A | 4/1984 | Ronco | |
| 4,476,975 A | 10/1984 | Densmore | |
| 4,667,813 A | 5/1987 | Densmore | |
| 4,674,803 A | 6/1987 | Sterwerf | |
| 4,717,206 A | 1/1988 | Sterwerf | |
| 4,766,995 A | 8/1988 | Sterwerf | |
| 4,773,528 A | 9/1988 | Anderson et al. | |
| 4,813,530 A | 3/1989 | Wechner | |
| 4,828,339 A | 5/1989 | Thomas et al. | |
| 4,856,384 A | 8/1989 | Wechner | |
| 4,865,184 A | 9/1989 | Wechner | |
| 4,865,185 A | 9/1989 | Bodimer | |
| 4,897,904 A | 2/1990 | Cowles | |
| 4,915,455 A | 4/1990 | O'Neill et al. | |
| 4,917,232 A | 4/1990 | Densmore | |
| 4,919,252 A | 4/1990 | Wechner | |
| 4,932,481 A | 6/1990 | Wechner | |
| 4,944,560 A | 7/1990 | Osterwise | |
| 4,947,535 A | 8/1990 | Cowles | |
| 5,000,310 A | 3/1991 | Edmondson | |
| 5,004,098 A | 4/1991 | Marshall | |
| 5,011,229 A | 4/1991 | O'Neill et al. | |
| 5,026,218 A | 6/1991 | Zimmerman | |
| 5,072,826 A | 12/1991 | Wechner | |
| 5,088,594 A | 2/1992 | Edmondson | |
| 5,088,797 A | 2/1992 | O'Neill | |
| 5,106,166 A | 4/1992 | O'Neill | |
| 5,156,256 A | 10/1992 | David | |
| 5,161,670 A | 11/1992 | David | |
| 5,163,545 A | 11/1992 | David | |
| 5,165,766 A | 11/1992 | Thomas | |
| 5,186,526 A | 2/1993 | Pennington | |
| 5,242,358 A | 9/1993 | Cowles | |
| 5,254,047 A | 10/1993 | Anderson | |
| 5,285,736 A | 2/1994 | Sturniolo | |
| 5,302,005 A | 4/1994 | O'Neill | |
| 5,348,130 A | 9/1994 | Thomas | |
| 5,404,997 A | 4/1995 | Schreier | |
| 5,518,299 A | 5/1996 | Adamczyk et al. | |
| 5,597,393 A | 1/1997 | Johnson | |
| 5,692,807 A | 12/1997 | Zimmerman | |
| 5,725,283 A | 3/1998 | O'Neill | |
| 5,795,032 A | 8/1998 | Zimmerman | |
| 5,811,976 A | 9/1998 | Fischer | |
| 5,873,431 A | 2/1999 | Butler et al. | |
| 5,950,673 A | 9/1999 | Elliott-Moore | |
| 6,007,157 A | 12/1999 | Stewart | |
| 6,148,954 A | 11/2000 | Harris | |
| 6,161,684 A | 12/2000 | David | |
| 6,170,848 B1 | 1/2001 | Wechner | |
| 6,216,852 B1 | 4/2001 | David | |
| 6,224,164 B1 | 5/2001 | Hall et al. | |
| 6,302,623 B1 | 10/2001 | Nellson | |
| 6,325,460 B1 | 12/2001 | Frederick | |
| 6,364,148 B1 | 4/2002 | Neilson | |
| 6,386,640 B1 | 5/2002 | Neilson | |
| 6,401,914 B1 | 6/2002 | Greve | |
| 6,497,536 B1 | 12/2002 | Neilson | |
| 6,530,537 B2 | 3/2003 | Hanlon | |
| 6,565,162 B2 | 5/2003 | Stewart | |
| 6,571,936 B1 | 6/2003 | Melhuish | |
| 6,602,026 B1 | 8/2003 | Neilson | |
| 6,651,804 B2 | 11/2003 | Thomas et al. | |
| 6,662,932 B1 | 12/2003 | O'Neill | |
| 6,729,464 B2 | 5/2004 | Thomas et al. | |
| 6,764,141 B2 | 7/2004 | O'Neill | |
| 6,796,388 B2 | 9/2004 | O'Meley | |
| 6,814,155 B1 | 11/2004 | Nielson et al. | |
| 6,890,037 B2 | 5/2005 | Stewart | |
| 7,005,576 B2 | 2/2006 | Niederriter | |
| 7,115,822 B1 | 10/2006 | Day et al. | |
| 7,201,062 B2 | 4/2007 | Hill et al. | |
| 7,467,510 B2 | 12/2008 | Tout et al. | |
| 7,523,687 B2 | 4/2009 | Tout | |
| 7,607,866 B2 | 10/2009 | Eddowes et al. | |
| 8,016,102 B2 | 9/2011 | Morris | |
| 2004/0140182 A1 | 7/2004 | Morris | |
| 2009/0250318 A1 * | 10/2009 | O'Neill | 198/731 |

FOREIGN PATENT DOCUMENTS

| | | |
|---|---|---|
| GB | 868605 | 5/1961 |
| GB | 1054399 | 1/1967 |
| GB | 1537876 | 1/1979 |
| GB | 2215006 | 9/1989 |
| WO | WO 02/28750 | 4/2002 |

OTHER PUBLICATIONS

U.S. Appl. No. 60/238,877, filed Oct. 6, 2000, Morris.
U.S. Appl. No. 10/398,387, filed Apr. 7, 2003, Morris.
"Product—Introduction—DA—3502-A, Our new chain offers great benefits for the mining industry," Mining Media International Journal (Aug. 28, 2009).
One-Page Drawing p. X9018H—Prior art chain.
The DA-450 Conveyor Chain internal memo dated Oct. 3, 2000 listing experiment dates.

* cited by examiner

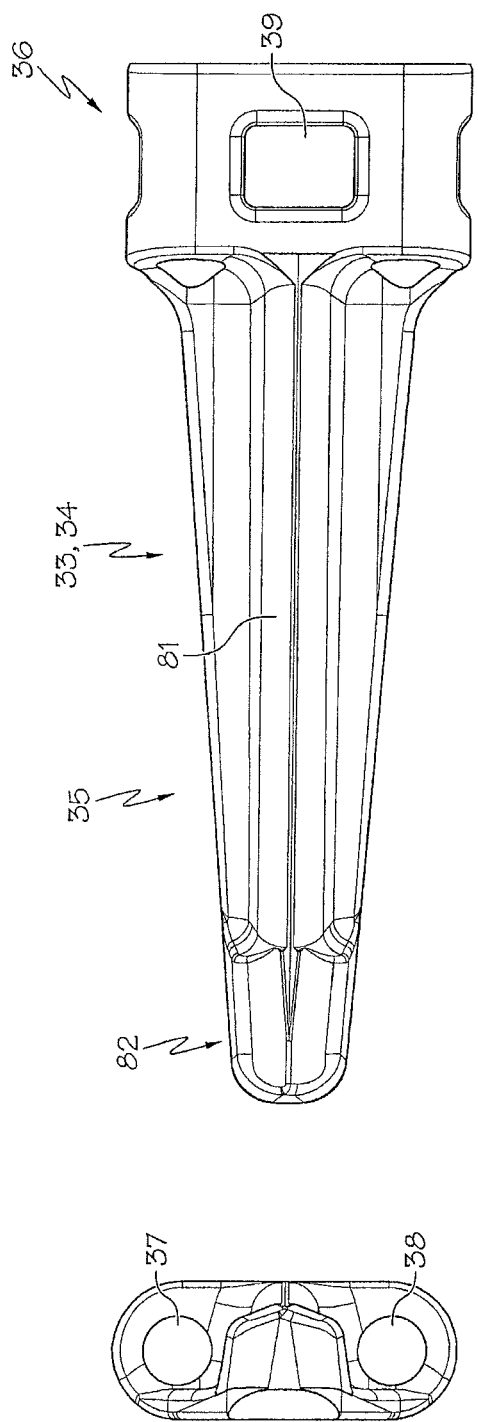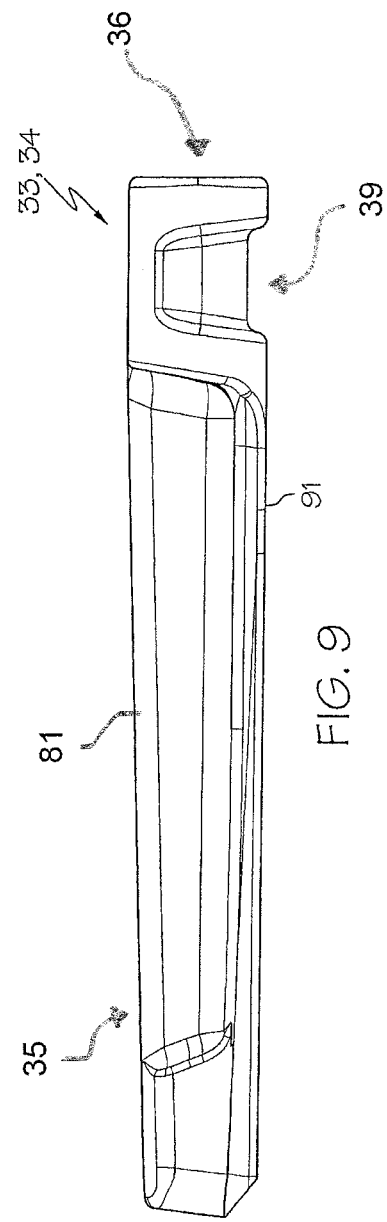
FIG. 8
FIG. 9
FIG. 10

CONVEYOR CHAIN

PRIORITY

This application claims priority to U.S. Provisional Patent Application Ser. No. 61/098,870, filed Sep. 22, 2008, entitled "Conveyor Chain," the disclosure of which is incorporated by reference herein, and U.S. Provisional Patent Application Ser. No. 61/234,398, filed Aug. 17, 2009, entitled "Conveyor Chain," the disclosure of which is incorporated by reference herein.

BACKGROUND

Pusher-type chain conveyors, as used in the mining industry, are found both in the form of separate conveying units, and as integral parts of continuous mining machines. One example of a continuous mining machine is a self-propelled mining machine. It is provided at its forward end with cutting means shiftable in such a way that an entry is cut in the material being mined. The entry is so sized as to permit passage of the mining machine therethrough. Since the cutting operation is a continuous one, it is advantageous to provide means to move the cut material from in front of the mining machine and to convey it out of the entry.

One or several conveyors may be incorporated into the mining machine's construction that act successively to transport the cut material rearwardly from the machine. One example of a conveyor that is incorporated into the mining machine extends from the front to the rear of the machine. The purpose of this conveyor is to remove the cut material from entry and deliver the cut material to other conveying means. The other conveying means may comprise mine cars or other vehicles used for hauling, portable belt conveyors or other conveyors designed for loading and unloading mined material from the mining machine, or the like.

An example of a conveyor that has been encountered in association with a continuous mining machine includes a section of conveyor base means mounted on the mining machine body. One or more additional sections of conveyor base means are connected thereto end-to-end, and extend beyond the rearward end of the mining machine body. All of the base means sections are characterized by a bottom portion provided with longitudinally extending, upstanding side guides or flanges. The various sections of the tail conveyor can be capable of both lateral and vertical movement with respect to each other, which enables the cut material to be delivered to a desired point despite changes of position of the mining machine as it advances in the entry and changes in level of the entry floor. The lateral and vertical movement capability of the conveyor sections may also enable the shifting of the desired delivery point for the material being mined, as required.

This type of conveyor may incorporate a continuous pusher-type conveyor chain, which is driven along the length of the conveyor base sections. The chain may be provided with a plurality of rigid pusher elements, normally extending substantially transversely of the conveying direction. The pusher elements are located at spaced intervals along the chain. Adjacent pusher elements may be joined together by a series of alternate block-like links and plate-like links. At one end of the machine's conveyor, the continuous chain passes over a driven sprocket. At the other end of the conveyor, the chain passes over a driven or idler sprocket, or roller.

Various embodiments of a conveyor chain configured to be used in conjunction with a dual drive sprocket on a mining machine are disclosed in the following applications: U.S. Provisional Patent Application No. 60/238,877, filed Oct. 6, 2000; PCT Patent Application Ser. No. PCT/US01/31746, filed Oct. 9, 2001; and U.S. Nonprovisional patent application Ser. No. 10/398,387, which was filed on Apr. 7, 2003; the disclosures of which are incorporated by reference herein.

While a variety of conveyor chains have been made and used, it is believed that no one prior to the inventor has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

FIG. 8 depicts a top plan view of an exemplary flight arm.

FIG. 9 depicts a side elevation view of the exemplary flight arm of FIG. 8.

FIG. 10 depicts an end view of the exemplary flight arm of FIG. 8.

Figure 1:
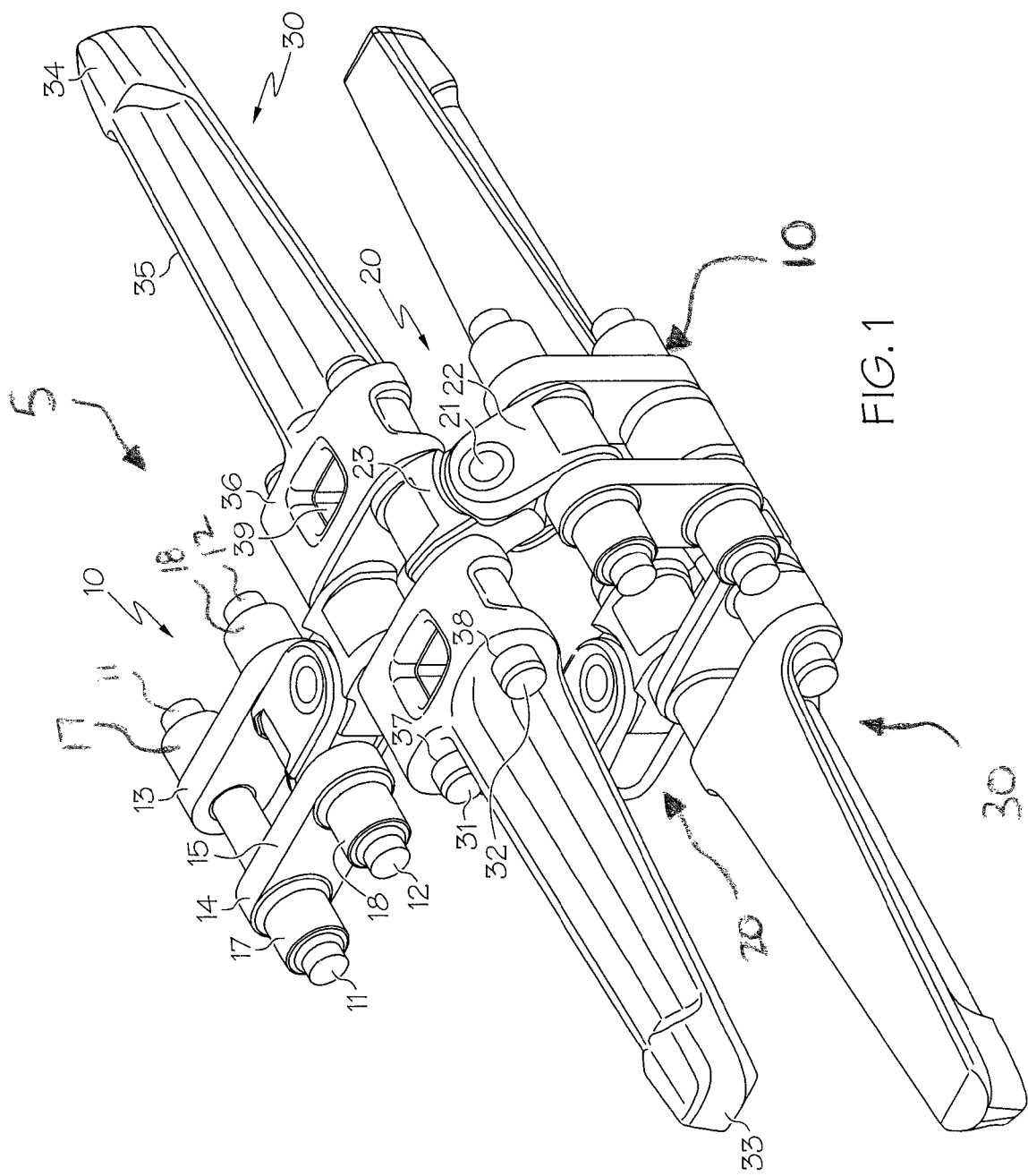
FIG. 1 depicts a perspective view of a segment of an exemplary conveyor chain.
Figure 2:
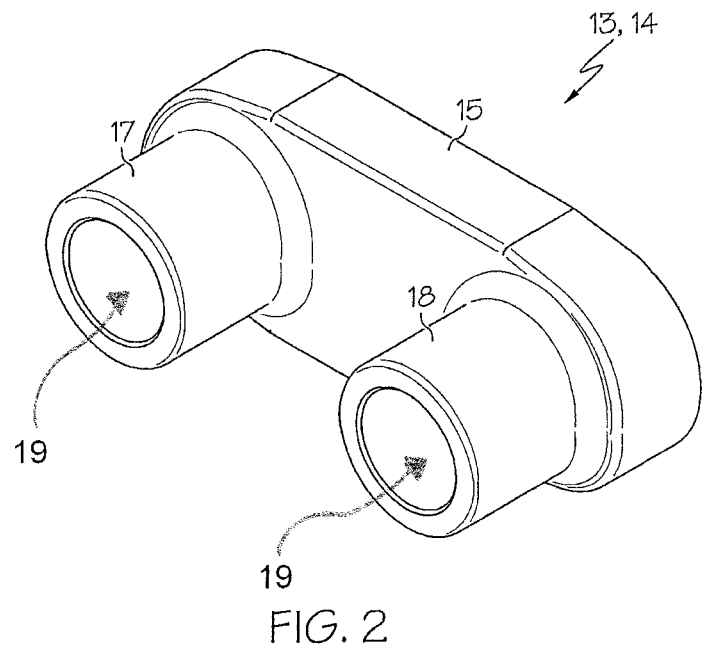
FIG. 2 depicts a perspective view of an exemplary side strap.
Figure 3:
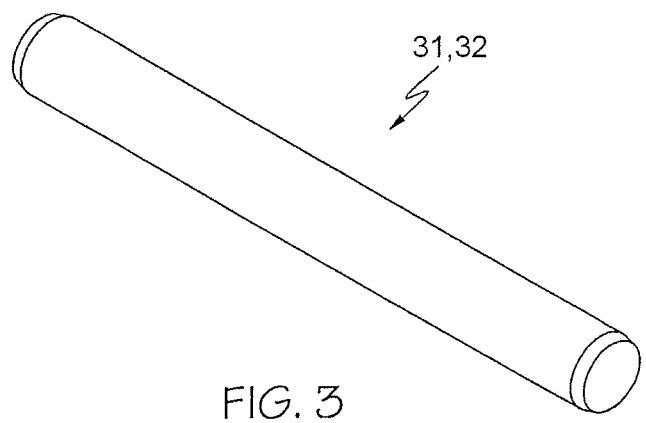
FIG. 3 depicts a perspective view of an exemplary flight pin.
Figure 4:
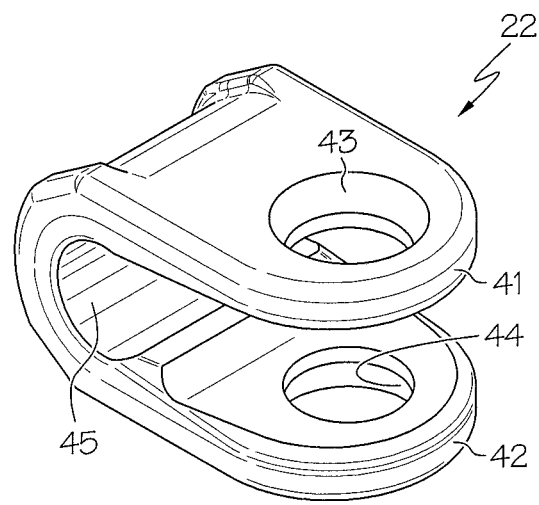
FIG. 4 depicts a perspective view of an exemplary universal link.
Figure 5:
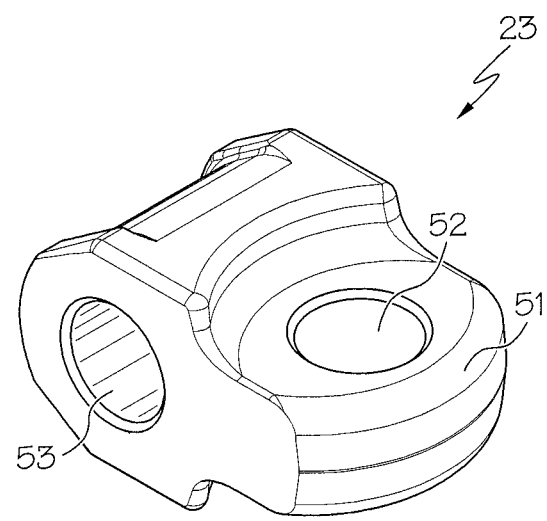
FIG. 5 depicts a perspective view of an exemplary connector link.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

As shown in FIG. 1, a section of conveyor chain (5) comprises two side link assemblies (10), four connector assemblies (20) (one is not shown in FIG. 1), and two flight arm assemblies (30). Of course, conveyor chain (5) may comprise any suitable number of side link assemblies, connector assemblies, and flight assemblies to produce a chain of sufficient length for a particular application. It will be appreciated that side strap (13) may be virtually identical to side strap (14). In the illustrated embodiment, each universal connector assembly (20) comprises a universal link (22) and a connector link (23) with a universal pin (21) extending through the universal link (22) and the connector link (23). As shown in FIG. 1, each flight arm assembly (30) comprises a pair of flight arm pins (31, 32) and a pair of flight arms (33, 34).

Figure 12:
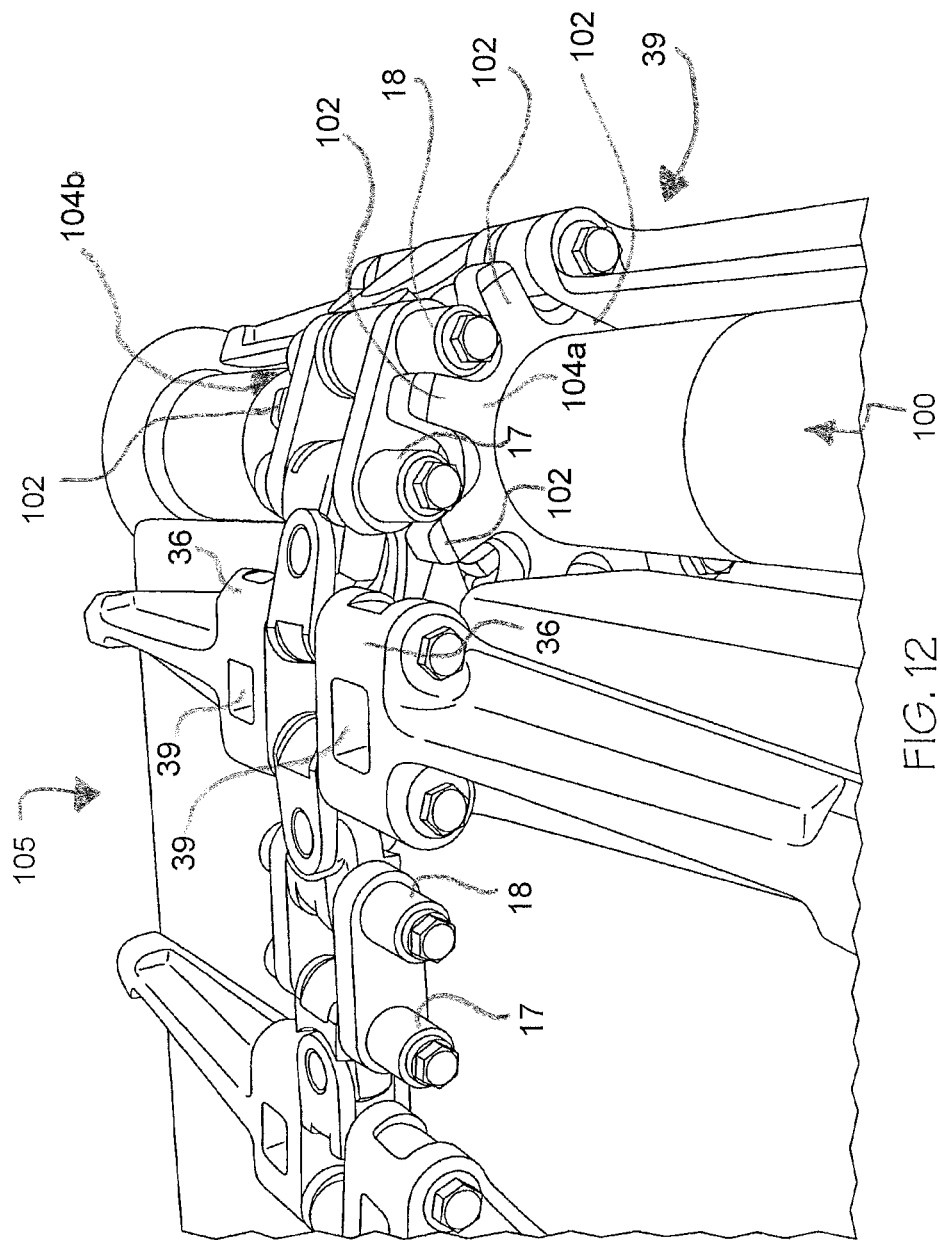
FIG. 12 depicts a perspective view of a section of exemplary conveyor chain engaged with an exemplary driving member comprising a dual drive sprocket.
Figure 13:
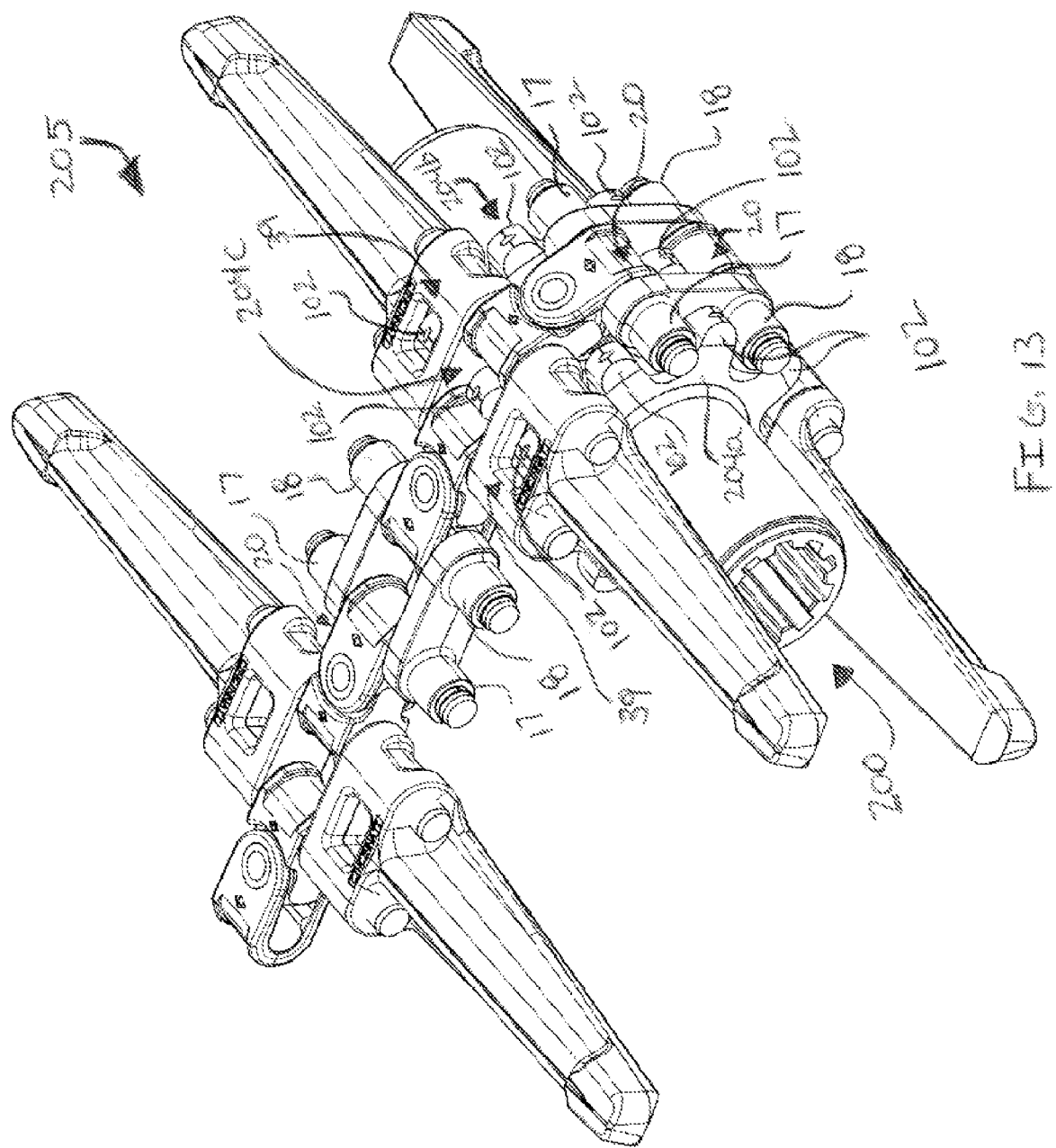
FIG. 13 depicts a perspective view of a section of exemplary conveyor chain engaged with an exemplary driving member comprising a triple drive sprocket.

In the illustrated embodiment, the two side straps (13, 14) of each side link assembly (10) are spaced apart and positioned so that the two side strap bosses (17, 18) are facing outwardly. In this example, each side strap boss (17, 18) comprises a hollow circular protrusion that includes an opening (19) that extends through the side strap boss (17, 18) and base (15). Each side strap boss (17, 18) is configured to receive at least a portion of a connecting pin (11, 12). Of course, side strap bosses (17, 18) may comprise any suitable shape, including but not limited to circular and square. As shown in FIGS. 12 and 13, the side strap bosses (17, 18) are configured to engage a tooth (102) of a sprocket such as one of sprockets (104*a*, 104*b*) of drive mechanism (100) or outer sprockets (204*a*, 204*b*) of drive mechanism (200) when the chain is engaged and driven by a driving member, such as a dual drive sprocket (100), a triple drive sprocket (200) or any other suitable driving member. In the illustrated embodiment, the side strap (13) in each side link assembly (10) is aligned with side strap (14) such that each side strap boss (17, 18) of side strap (13) is aligned with a corresponding side strap boss (17, 18) of side strap (14). In this example, a first connecting pin (11) is inserted through the aligned side strap bosses (17) in side straps (13, 14), while a second connecting pin (12) is inserted through the aligned side strap bosses (18) in side straps (13, 14). Collectively, the side straps (13, 14) and connecting pins (11, 12) form a side link assembly (10). The diameter of the connecting pin (11, 12) may be about 1⅛ inch, or any other suitable dimension. By way of example only, in some embodiments the diameter of the connecting pin (11, 12) may range from about 1 inch to about 1¼ inch. Increasing the diameter of the connecting pins (11, 12) compared to bearing pins used in existing conveyor chains may improve the strength and reliability of the conveyor chain during operation while reducing the chance of chain breakage The connecting pins (11, 12) and side strap bosses (17, 18) may be configured to provide a press fit, a sliding close tolerance fit, or any other suitable fit between the components. Connecting pins (11, 12) may be retained within side strap bosses (17, 18) by keeper pins, retaining rings, by press fit alone, or by any other suitable method or device.

Figure 6:
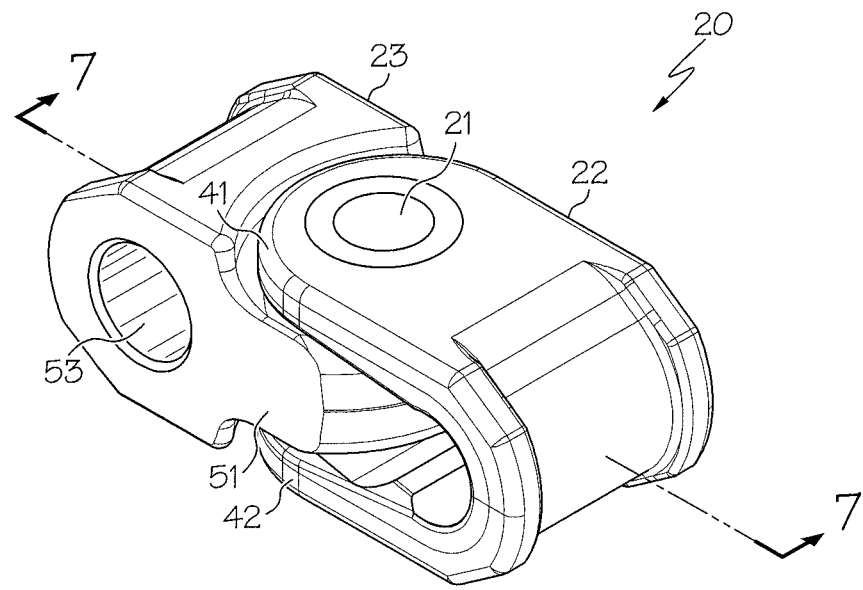
FIG. 6 depicts a perspective view of an exemplary universal connector assembly.

FIGS. 4-7 depict one embodiment of a universal connector assembly (20). In the illustrated embodiment, universal connector assembly (20) comprises a universal pin (21), a universal link (22), and a connector link (23). The universal link (22) as pictured in FIG. 4, comprises an upper lip (41) and lower lip (42) each having a vertical thru-hole (43, 44) that is configured to receive at least a portion of the universal pin (21). The universal link (22) can also be described as the female link. In this example, universal link (22) further comprises connecting portion (45) that extends between upper lip (41) and lower lip (42). As shown, connecting portion (45) is rounded and is configured to receive at least a portion of a connecting pin (11, 12) or a flight pin (31,32). In the illustrated embodiment, connector link (23) comprises a projecting member (51) sized and shaped to fit between the upper lip (41) and lower lip (42) of the universal link (22) as shown in FIG. 6. The connector link (23) can also be described as a male link. In this version, projecting member (51) includes a vertical thru-hole (52) that is configured to receive a universal pin (21). In this example, connector link (23) further comprises a horizontal opening (53) that extends through the width of connector link (23) is configured to receive at least a portion of a connecting pin (11, 12) or a flight pin (31, 32).

Figure 7:
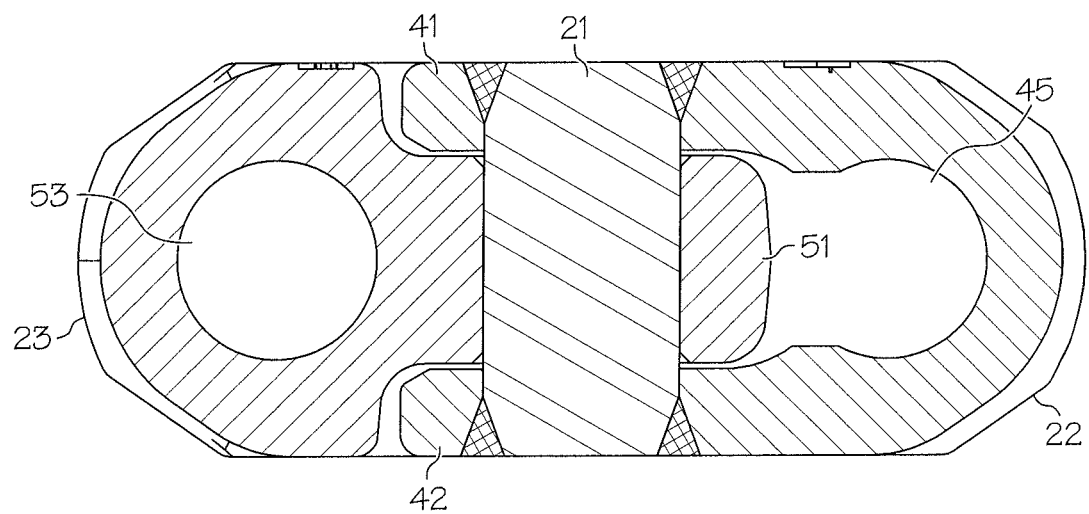
FIG. 7 depicts a side cross-sectional view of the exemplary universal connector assembly of FIG. 6.
Figure 11:
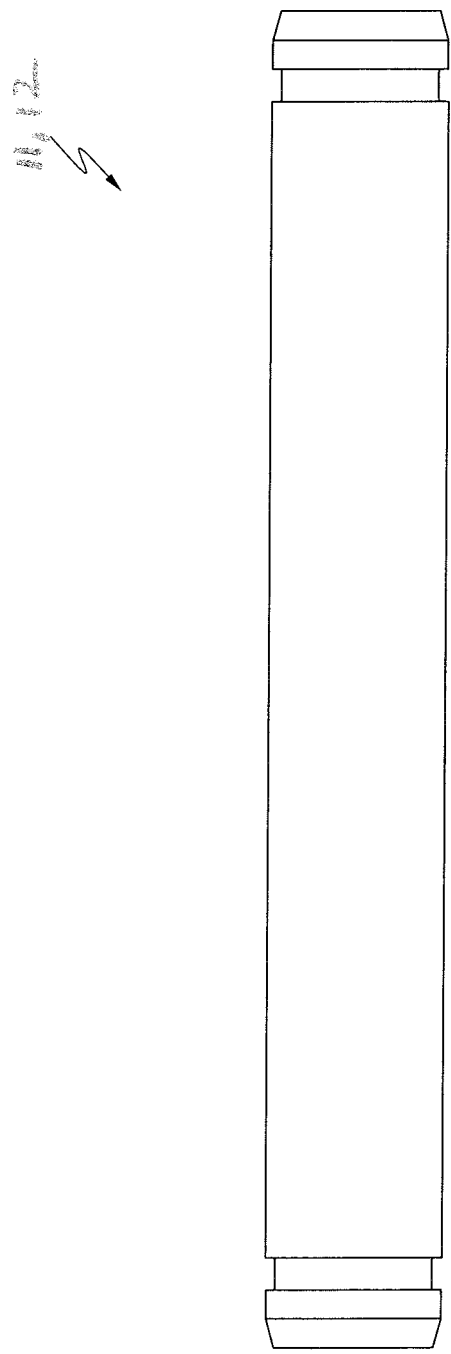
FIG. 11 depicts a perspective view of an exemplary connecting pin.

As shown in FIGS. 6 and 7, when universal connector assembly (20) is fully assembled, the projecting member (51) of the connector link (23) is inserted between the upper lip (41) and lower lip (42) of the universal link (22). In this example, vertical thru-holes (42, 43) of the universal link (22) are axially aligned with vertical thru-hole (52) of the connector link, such that the universal pin (21) may pass through the vertical thru-holes (42, 43, 52) as shown in FIGS. 6 and 7. The universal pin (21) may be configured to increase mobility of the chain, allow the chain to articulate past objects, and reduce the load transmitted to the connecting pins (11, 12) when an obstruction in a conveying deck is encountered.

As shown in FIG. 1, flight assembly (30) comprises a pair of flight pins (31, 32) and a pair of flight arms (33, 34). In this example, each flight arm (33, 34) comprises an elongated body (35) extending substantially perpendicular from a base (36). In this version, each base (36) includes a pair of flight arm attachment apertures (37, 38) that extend transversely through the base (36). Each flight arm attachment aperture (37, 38) may be configured to receive at least a portion of one of the flight arm pins (31, 32). As shown, each base (36) further comprises a vertical sprocket opening (39) that extends vertically through the base (36). The diameter of the flight pin may be about 1⅛ inch, or any other suitable dimension. By way of example only, in some embodiments the diameter of the connecting pin (31, 32) may range from about 1 inch to about 1¼ inch. Increasing the diameter of the flight pins (31, 32) compared to bearing pins used in existing conveyor chains may improve the strength and reliability of the conveyor chain during operation while reducing the chance of chain breakage. The flight pins (31, 32) and bases (36) may be configured to provide a press fit, a sliding close tolerance fit, or any other suitable fit between the components. Flight pins (31, 32) may be retained within the flight arm attachment apertures (37, 38) of bases (36) by keeper pins, retaining rings, by press fit alone, or by any other suitable method or device.

As shown in FIGS. 8-10, flight arm (33, 34) comprises an elongated body (35) having a flat, planar bottom surface (91) and an integral base (36). In this version, elongated body (35) comprises a central rib (81) that may act as a pusher for the material being conveyed. In this example, the outer free end of flight arm (33, 34) is provided with a knob-like portion (82) which can ride against side guide elements associated with conveyors. The base (36) may be provided with a vertical sprocket opening (39). As shown in FIGS. 12 and 13, sprocket opening (39) is sized and shaped to engage a tooth (102) of a sprocket such as one of sprockets (104*a*, 104*b*) of driving member (100) or sprockets (204*a*, 204*b*) of driving member (200) when the chain is engaged and driven by a driving member, such as a dual drive sprocket (100), a triple drive sprocket (200) or any other suitable driving member. While sprocket opening (39) is substantially rectangular in the illustrated embodiment, it will be appreciated that sprocket opening (39) may comprise any suitable shape configured to receive and engage a tooth (102), including but not limited to circular, oval, square, and rectangular. In the illustrated version, base (36) also comprises two flight arm attachment aperture (37, 38). As shown in FIG. 1, flight arm (33) in each flight arm assembly (30) is aligned with flight arm (34) such that the flight arm attachment apertures (37, 38) of flight arm (33) are aligned with the flight arm attachment apertures (37, 38) of flight arm 34. In this example, a first flight pin (31) is inserted through the aligned flight arm attachment apertures (37) in flight arms (33, 34), while a second flight pin (32) is inserted through the aligned flight arm attachment apertures (38) in flight arms (33, 34). In addition, each of the flight pins (31, 32) are inserted through horizontal openings (53) of a pair of connector links (23) positioned between the flight arms (33, 34).

As shown in FIG. 1, section of conveyor chain (5) comprises a plurality of alternating side link assemblies (10) and flight arm assemblies (30) connected by connector assemblies (20). In this version, each universal connector assembly (20) is configured and arranged to be connected to both a side link assembly (10) and a flight arm assembly (30). In this example, conveyor chain (5) comprises a side link assembly (10) connected to a first universal connector assembly (20), a flight arm assembly (30) connected to both the first universal connector assembly (20) and a second universal connector assembly (20), and the second universal connector assembly (20) is connected to a second side link assembly (10) and so on in a repeating pattern. While the illustrated version depicts a chain comprising alternating side strap assemblies (10) and flight arm assemblies (30), it will be appreciated that a section of chain may comprise any suitable arrangement of side strap assemblies (10) and flight arm assemblies (30). By way of example only, in an alternate embodiment (not shown), a section of conveyor chain may comprise two side strap assemblies positioned between a pair of flight arm assemblies. As shown in FIG. 1, a side link assembly (10) is connected to a universal connector assembly (20) via a connecting pin (12). In this version, connecting pin (12) is positioned such that it passes through the aligned side strap bosses (18) of side straps (13, 14) and the opening formed by connecting member (45) of universal link (22). Alternatively, a side link assembly (10) may be connected to a universal connector assembly (20) via a connecting pin (11) such that connecting pin (11) is positioned so that it passes through the aligned side strap bosses (17) of side straps (13, 14) and the horizontal opening (53) in connector link (23). Similarly, flight assembly (30) may be connected to a universal connector assembly (20) by positioning a flight pin (31, 32) through a pair of aligned flight arm attachment apertures (37, 38) in two opposing flight arms (33, 34) and the horizontal opening (53) in connector link (23). Alternatively, a flight assembly (30) may be connected to a universal connector assembly (20) by positioning a flight pin (31, 32) through a pair of aligned flight arm attachment apertures (37, 38) in two opposing flight arms (33, 34) and the opening formed by connecting member (45) in a universal link (22).

As shown in FIG. 12, conveyor chain (105) is driven by a driving member (100). In this example, driving member (100) comprises a dual drive sprocket that includes sprockets (104a, 104b). It will be appreciated that driving member (100) may comprise any suitable number of sprockets, including but not limited to a dual drive sprocket as shown in FIG. 12, a triple drive sprocket as shown in FIG. 13, or any other suitable number of sprockets. It will further be appreciated that driving member may comprise any suitable size sprockets, including but not limited to a four tooth sprocket, five tooth sprocket, a six-tooth sprocket, an eight tooth sprocket, and various combinations thereof. Use of a dual drive sprocket, such as driving member (100) shown in FIG. 12, and a corresponding conveyor chain configured to be used with a dual drive sprocket, such as conveyor chains (5, 105, 205), may reduce operational noise and improve sprocket tooth life. The two sprockets (104a, 104b) comprising driving member (100) may be substantially identical to each other and configured to rotate in unison with each other. By way of example only, in the embodiments shown in FIG. 12, sprockets (104a, 104b) are each eight-tooth sprockets.

As shown, sprockets (104a, 104b) are spaced apart so that they are aligned with the side strap bosses (17, 18) and the vertical sprocket openings (39) along each side of the chain (105). In the illustrated embodiment, as conveyor chain (105) wraps around driving member (100), each sprocket tooth (102) engages a side strap boss (17, 18) or the base (36) of a flight arm (33, 34) via a vertical sprocket opening (39) along both sides of the chain (105). As shown, a first sprocket tooth (102) may abut a first side strap boss (17), while a second sprocket tooth (102) may abut a second side strap boss (18), while a third sprocket tooth (102) may be received by and extend at least partially through a vertical sprocket opening (39). Although not shown in FIG. 12, additional sprocket teeth may engage additional side strap bosses and vertical sprocket openings as the chain wraps around the dual sprocket. In the illustrated embodiment, the sprocket teeth (102) do not directly engage or contact connecting pins (11, 12) or flight pins (31, 32). Because the points of engagement between conveyor chain (105) and sprocket teeth (102) (i.e. side strap bosses (17, 18) and flight arm bases (36)) are thicker than the points of engagement in some prior art conveyor chains (where sprocket teeth directly engage bearing pins in the chain), conveyor chain (105) may provide improved chain life and strength.

As shown in FIG. 13, conveyor chain (205) is driven by a driving member (200). In this example, driving member (200) comprises a triple drive sprocket that includes two outer sprockets (204a, 204b) and a central sprocket (204c). It will be appreciated that driving member (200) may comprise any suitable number of sprockets, including but not limited to a dual drive sprocket as shown in FIG. 12, a triple drive sprocket as shown in FIG. 13, or any other suitable number of sprockets. It will further be appreciated that driving member may comprise any suitable size sprockets, including but not limited to a four tooth sprocket, five tooth sprocket, a six-tooth sprocket, an eight tooth sprocket, and various combinations thereof. Use of a triple drive sprocket, such as driving member (200) shown in FIG. 13, and a corresponding conveyor chain configured to be used with a triple drive sprocket, such as conveyor chains (5, 105, 205), may reduce operational noise and improve sprocket tooth life. The two outer sprockets (204a, 204b) may be substantially identical to each other, while central sprocket (204c) may be configured to have half as many sprocket teeth as outer sprockets (204a, 204b). Other suitable relationships between the outer sprockets and the central sprocket may be apparent to those of ordinary skill in the art. All three sprockets (204a, 204b, 204c) may be configured to rotate in unison with each other. By way of example only, in the embodiment shown in FIG. 13, outer sprockets (204a, 204b) are each eight-tooth sprockets and central sprocket (204c) is a four-tooth sprocket.

As shown, outer sprockets (204a, 204b) are spaced apart so that they are aligned with the side strap bosses (17, 18) and the vertical sprocket openings (39) along each side of the chain (205). Also, in this example, central sprocket (204c) is positioned so that the teeth (102) of central sprocket (204c) are received in the gap between adjacent universal connector assemblies (20) and engage a universal connector assembly (20). In the illustrated embodiment, as conveyor chain (205) wraps around driving member (200), each sprocket tooth (102) of the outer sprockets (204a, 204b) engages a side strap boss (17, 18) or the base (36) of a flight arm (33, 34) via a vertical sprocket opening (39) along both sides of the chain (205). At the same time, each sprocket tooth (102) of central sprocket (204c) engages a universal connector assembly (20) along the central longitudinal axis of the chain (205). As shown, a first sprocket tooth (102) of an outer sprocket (204a, 204b) may abut a first side strap boss (17), while a second sprocket tooth (102) of an outer sprocket (204a, 204b) may abut a second side strap boss (18), while a third tooth (102) of an outer sprocket (204a, 204b) may be received by and extend at least partially through a vertical sprocket opening (39). At the same time, a first sprocket tooth (102) of central sprocket (204c) may be received by and extend at least partially through an opening between a first pair of adjacent universal connector assemblies (20), while a second sprocket tooth (102) of central sprocket (204c) may be received by and extend at least partially through an opening between a second pair of adjacent universal connector assemblies (20). Although not shown in FIG. 13, additional sprocket teeth (102) on outer the outer sprockets (204a, 204b) may engage additional side strap bosses and vertical sprocket openings and additional sprocket teeth (102) on central sprocket (204c) may engage additional openings between additional pairs of adjacent universal connector assemblies (20) as the chain wraps around the driving member (200). In the illustrated embodiment, the sprocket teeth (102) do not directly engage or contact connecting pins (11,12) or flight pins (31, 32). Because the points of engagement between conveyor chain (205) and sprocket teeth (102) (i.e. side strap bosses (17, 18), flight arm bases (36), and universal connector assemblies (20)) are thicker than the points of engagement in some prior art conveyor chains (such as chains where sprocket teeth directly engage bearing pins in the chain), conveyor chain (205) may provide improved chain life and strength.

In an alternate embodiment (not shown), the driving member may comprise a single sprocket, such as central sprocket (204c) described above. In such an embodiment, the single sprocket may be positioned and configured to engage the chain by having the teeth of the sprocket received between adjacent universal connector assemblies, similar to the central sprocket (204c) described above.

A conveyor chain, such as conveyor chains (5, 105), may comprise an even pitch along substantially the entire length of the conveyor chain, although this is not required. The pitch may comprise the distance between adjacent connecting pins (11, 12) and flight pins (31, 32). In one embodiment, the pitch may comprise about 3½ inches, although any suitable pitch may be used depending on the particular application. By way of example only, the pitch may also range from about 1 inch to about 5 inches in length, or more particularly from about 2½ inches to about 4½ inches in length. A conveyor chain with an even pitch may provide for an increased number of sprocket teeth engaged with the chain and may allow for the use of a driving member that comprises two or more individual sprockets.

It should be appreciated that the various components may be comprised of any suitable material known in the art that exhibits the requisite strength and durability characteristics based on the intended application of the chain. By way of example only, the various components may comprise forged steel, cast steel, spring steel, composite steel, plastic, other suitable materials and combinations thereof. Each of the components may comprise the same material, or alternatively, different components may comprise different materials. In addition, by way of example only the flight arms (33, 34) or any other suitable components, may be made of composite steel and plastic, urethane, or other material that can reduce noise levels during operation, although this is not required.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A conveyor chain for being driven by at least two drive sprockets, the conveyor chain comprising:
   a plurality of side link assemblies and flight arm assemblies coupled together to form an elongated chain;
   at least one flight arm assembly including a pair of opposing flight arms positioned on either side of the chain, the flight arms each comprising:
      an elongated body and an integral base formed with the elongated body, the elongated body extending substantially perpendicular from the integral base;
      a vertical sprocket opening formed in the integral base and configured to extend vertically through the integral base, the vertical sprocket opening being shaped to engage a tooth of a drive sprocket so that the tooth acts on the integral base to drive the flight arm;
   integral bases of the opposing flight arms configured to engage a respective tooth of a drive sprocket positioned on either side of the chain for driving the flight arm assembly on both sides of the chain;
   at least one side link assembly including a pair of opposing side straps positioned on either side of the chain, the side straps each comprising,
      a base;
      at least a pair of side strap bosses extending outwardly from the base;
      at least one of the side strap bosses being configured to engage a tooth of a drive sprocket so that the tooth acts on the side strap boss to drive the side strap;
      side strap bosses of the opposing side straps configured to engage a respective tooth of a drive sprocket positioned on either side of the chain for driving the side link assembly on both sides of the chain.

2. The conveyor chain of claim 1 further comprising at least one universal connector assembly, the universal connector assembly positioned between a flight arm assembly and a side link assembly and coupling the flight arm assembly and the side link assembly to form the elongated chain.

3. The conveyor chain of claim 1, a flight arm assembly further including at least one flight pin, the opposing flight arms each including at least one flight arm attachment aperture extending transversely through the integral base and configured to receive the flight pin, the flight pin engaging respective flight arm attachment apertures of the opposing flight arms to couple the integral bases of the flight arms together into a flight arm assembly of the chain.

4. The conveyor chain of claim 3, the flight arm assembly further including at least a pair of flight pins and the opposing flight arms each including at least a pair of flight arm attachment apertures extending transversely through the integral base and configured to receive the flight pins.

5. The conveyor chain of claim 1, a side link assembly further including at least one connecting pin, the opposing side straps each including at least one opening extending through the base and at least one of the side strap bosses, the opening configured to receive the connecting pin, the connecting pin engaging respective openings of the opposing side straps to couple the side straps together into a side link assembly of the chain.

6. The conveyor chain of claim 5, the side link assembly further including at least a pair of connecting pins and the opposing side straps each including at least a pair of openings extending transversely through the base and side strap bosses and configured to receive the connecting pins.

7. The conveyor chain of claim 4 wherein the flight arm attachment apertures of the pair are positioned respectively forwardly and rearwardly of the vertical sprocket opening formed in the integral base.

8. The conveyor chain of claim 1 wherein the side strap bosses of the pair are positioned at opposite ends of the side strap base.

9. The conveyor chain of claim 2 wherein the at least one universal connector assembly comprises:
   a universal pin;
   a universal link having an upper lip and a lower lip and corresponding vertical thru-holes configured to receive at least a portion of the universal pin, and a connecting portion extending between the upper lip and the lower lip and forming an opening there through;
   a connector link having a projecting member with a vertical thru-hole configured to receive at least a portion of the universal pin, the projecting member being configured to be positioned between the upper lip and the lower lip of the universal link such that the corresponding thru-holes of the lips are aligned, a horizontal opening extending laterally through the connector link;
   the universal pin coupling the connector link and universal link together to form the universal connector assembly.

10. The conveyor chain of claim 9 further comprising at least one flight pin extending between opposing flight arms to couple the integral bases of the flight arms and at least one connecting pin extending between opposing side straps to couple the side strap bosses of the side straps, the openings formed in the universal link and connector link configured to receive at least a portion of one of a flight pin or a connecting pin.

11. The conveyor chain of claim 1 wherein the elongated body of a flight arm includes a substantially flat bottom surface and a central rib.

12. The conveyor chain of claim 9, wherein at least one of the universal link or the connector link of the universal connector assembly is configured to engage a tooth of a drive sprocket so that the tooth acts thereon to drive the universal connector assembly.

13. A conveyor system comprising:
   a driving member, the driving member including a first drive sprocket and second drive sprocket, each of the first drive sprocket and the second drive sprocket having a plurality of teeth;
   a conveyor chain for being driven by the drive sprockets of the driving member;
   the conveyor chain comprising:
   a plurality of side link assemblies and flight arm assemblies coupled together to form the chain;
   at least one flight arm assembly including a pair of opposing flight arms positioned on either side of the chain, the flight arms each comprising:
      an elongated body and an integral base formed with the elongated body, the elongated body extending substantially perpendicular from the integral base;
      a vertical sprocket opening formed in the integral base and configured to extend vertically through the integral base, the vertical sprocket opening being shaped to engage a tooth of a drive sprocket so that the tooth acts on the integral base to drive the flight arm;
   integral bases of the opposing flight arms configured to engage a respective tooth of the first and second drive sprockets positioned on opposing sides of the chain;
   at least one side link assembly including a pair of opposing side straps positioned on either side of the chain, the side straps each comprising,
      a base;
      at least a pair of side strap bosses extending outwardly from the base;
      at least one of the side strap bosses being configured to engage a tooth of a drive sprocket so that the tooth acts on the side strap boss to drive the side strap;
      side strap bosses of the opposing side straps configured to engage a respective tooth of the first and second drive sprockets positioned on opposing sides of the chain.

14. The conveyor system of claim 13 further comprising at least one universal connector assembly, the universal connector assembly positioned between a flight arm assembly and a side link assembly and coupling the flight arm assembly and the side link assembly to form the elongated chain.

15. The conveyor system of claim 13, a flight arm assembly further including a pair of flight pins, the opposing flight arms each including flight arm attachment apertures extending transversely through the integral base and configured to receive the flight pins, the flight pins engaging respective flight arm attachment apertures of the opposing flight arms to couple the integral bases of the flight arms together into a flight arm assembly of the chain.

16. The conveyor system of claim 13, a side link assembly further including a pair of connecting pins, the opposing side straps each including openings extending through the base and respective side strap bosses, the openings configured to receive the connecting pins, the connecting pins engaging respective openings of the opposing side straps to couple the side straps together into a side link assembly in the chain.

17. The conveyor system of claim 15 wherein the flight arm attachment apertures are positioned respectively forwardly and rearwardly of the vertical sprocket opening formed in the integral base.

18. The conveyor system of claim 13 wherein the side strap bosses of the pair are positioned at opposite ends of the side strap base.

19. The conveyor system of claim 14 wherein the driving member includes a third drive sprocket positioned between the first and second drive sprockets, the universal connector assembly being configured to engage a tooth of the third drive sprocket so that the tooth acts thereon to drive the universal connector assembly.

20. The conveyor system of claim 14 wherein the at least one universal connector assembly comprises:

a universal pin;

a universal link having an upper lip and a lower lip and corresponding vertical thru-holes configured to receive at least a portion of the universal pin, and a connecting portion extending between the upper lip and the lower lip and forming an opening there through;

a connector link having a projecting member with a vertical thru-hole configured to receive at least a portion of the universal pin, the projecting member being configured to be positioned between the upper lip and the lower lip of the universal link such that the corresponding thru-holes of the lips are aligned, a horizontal opening extending laterally through the connector link;

the universal pin coupling the connector link and universal link together to form the universal connector assembly.

21. The conveyor system of claim 13, wherein the conveyor chain comprises a length, wherein the conveyor chain is evenly pitched along the length of the conveyor chain.

\* \* \* \* \*